United States Patent
Feller

(10) Patent No.: US 8,235,589 B1
(45) Date of Patent: Aug. 7, 2012

(54) SPECIFIC HEAT MEASUREMENT PROBE

(76) Inventor: Murray F Feller, Micanopy, FL (US)

( * ) Notice: Subject to any disclaimer, the term of this patent is extended or adjusted under 35 U.S.C. 154(b) by 418 days.

(21) Appl. No.: 12/579,469

(22) Filed: Oct. 15, 2009

Related U.S. Application Data

(63) Continuation-in-part of application No. 12/499,420, filed on Jul. 8, 2009, now Pat. No. 7,775,706, and a continuation-in-part of application No. 12/560,521, filed on Sep. 16, 2009, now Pat. No. 8,142,071.

(51) Int. Cl.
  *G01K 15/00* (2006.01)
  *G01K 17/06* (2006.01)
  *G01N 25/20* (2006.01)
(52) U.S. Cl. .................... 374/39; 374/1; 374/45; 374/43
(58) Field of Classification Search ............... 374/1, 45, 374/43, 39
See application file for complete search history.

(56) References Cited

U.S. PATENT DOCUMENTS

| | | | |
|---|---|---|---|
| 3,245,260 A * | 4/1966 | Werner | 374/148 |
| 4,618,266 A * | 10/1986 | Feller | 374/41 |
| 5,237,523 A | 8/1993 | Bonne et al. | |
| 5,311,447 A * | 5/1994 | Bonne | 702/50 |
| 5,948,978 A | 9/1999 | Feller | |
| 5,983,700 A | 11/1999 | Yamaguichi et al. | |
| 6,023,969 A | 2/2000 | Feller | |
| 6,241,383 B1 | 6/2001 | Feller et al. | |
| 6,443,003 B1 | 9/2002 | Bialis | |
| 2002/0174718 A1 * | 11/2002 | Yamakawa | 73/204.26 |
| 2006/0123892 A1 * | 6/2006 | Brekelmans et al. | 73/61.76 |
| 2009/0154520 A1 * | 6/2009 | Richner et al. | 374/29 |

* cited by examiner

*Primary Examiner* — Mirellys Jagan
(74) *Attorney, Agent, or Firm* — David A Kiewit

(57) ABSTRACT

The specific heat of a working fluid flowing along a channel is measured without having to provide an explicit flow rate correction. A specific heat sensing probe is configured with a stagnation enclosure surrounding a thermal transfer sensor. The stagnation enclosure is designed to provide a stagnation chamber in throttled communication with an outside of the enclosure so that the working fluid can flow into and out of the stagnation chamber at a seepage rate substantially less than the fluid flow rate. The thermal transfer sensor is operable to exchange heat with adjacent fluid and to provide a signal representative of the quantity of heat exchanged.

8 Claims, 5 Drawing Sheets

US 8,235,589 B1

SPECIFIC HEAT MEASUREMENT PROBE

RELATION TO OTHER APPLICATIONS

This application is a continuation in part of U.S. Ser. No. 12/499,420, filed on Jul. 8, 2009 and of U.S. Ser. No. 12/560,521, filed on Sep. 16, 2009.

BACKGROUND OF THE INVENTION

1. Field of the Invention

This invention relates to calorimetry, and more specifically to calorimetric measurements of working fluids flowing in a heat exchanger.

2. Background Information

Heat meters, often referred to as BTU meters or net energy flow meters, determine the heat energy flow of a heat exchanger by measuring the flow rate of the heat exchanger fluid and the difference in temperature across the heat exchanger and by multiplying those measured quantities by a factor selected to represent the specific heat of the fluid. The specific heat factor is generally selected based on a measured or presumed composition of the fluid and is corrected for changes in temperature.

In a practical application, such as an apartment building where a heat metered hydronic heating system has been installed, the composition of the water-based working fluid may not remain constant. This may be because of loss of some of the working fluid and replacement of it by a different fluid; because of chemical changes of one or more of the working fluid's components; or because of accumulation of debris in the plumbing system. As a result of any of these or other causes, the specific heat of the fluid can change from the value originally assumed or measured. When this occurs, the heat meter no longer measures heat transfer accurately.

Changes in the specific heat generally occur much more slowly than changes in flow rate. An exception to this occurs when a system is turned off, drained and refilled, in which case both the flow rate and specific heat may register a sudden change when the system is restarted.

Measuring the specific heat of a working fluid in heat exchanger is complicated not only by variations in temperature and composition, but also by the ambient fluid flow rate. A thermal transfer sensor will transfer more heat to a flowing fluid than to a stationary one, so any attempt to measure specific heat in a flowing system must provide either a measurement at zero flow rate, or an extrapolated value equivalent thereto. For example, Yamaguichi et al., in U.S. Pat. No. 5,983,700, teaches suddenly shutting off flow, making the specific heat measurement under actual zero flow conditions, and then restoring normal flow. This approach is not acceptable in systems that require continuous, uninterrupted heat transfer. Another approach, taught by Bonne et al. in U.S. Pat. No. 5,237,523, is to extrapolate a set of measurements to zero flow. These methods may result in a residual inaccuracy due to incorrect extrapolations.

BRIEF SUMMARY OF THE INVENTION

One aspect of the invention is that it provides apparatus and method for measuring a specific heat value of a working fluid flowing along a channel at some selected rate. A preferred method involves the use of a flow probe comprising both a thermal transfer sensor and an enclosure surrounding the thermal transfer sensor. The thermal transfer sensor is operable to exchange heat with adjacent fluid and to provide a signal representative of the quantity of heat exchanged. When the enclosure is not present, a preferred thermal transfer probe can provide a signal representative of the flow rate of the working fluid. When the enclosure surrounds the thermal transfer sensor, it defines a stagnation chamber for holding an essentially stagnant portion of the working fluid in thermal contact with the thermal transfer sensor. The stagnation chamber is in throttled communication with an outside of the enclosure so that the working fluid can flow into and out of the stagnation chamber at a seepage rate substantially less than the fluid flow rate.

Using this preferred apparatus involves configuring a probe having an enclosure disposed around a thermal transfer sensor; inserting the probe into the working fluid; waiting for the stagnation chamber to be filled (or re-filled with a fresh sample of fluid) by seepage into that chamber; and then operating the thermal sensor to exchange heat with the fluid in the stagnation chamber so as to provide a signal representative of the amount of heat exchanged, from which the specific heat can be calculated. There are many ways to bring the probe into contact with the fluid. These include, without limitation, permanently installing a probe in a heat exchanger pipe so as to be in constant contact with the working fluid, and temporarily installing the probe in a pipe only when a measurement is to be made (e.g., by use of a known valved hot tap fitting).

Another aspect of the invention is that it provides a method of measuring a specific heat value at a selected temperature of a heat exchanger fluid, where a sample of the fluid from the heat exchanger is transferred to a measurement chamber having its temperature preferably controlled by means of a thermoelectric module. A thermal transfer probe inserted into the fluid sample is operated to exchange heat with the fluid in the measurement chamber and to provide a signal representative of the amount of heat exchanged. A value of the specific heat of the working fluid is then calculated from the signal. A measurement of this sort may be calibrated by providing a reference fluid having a known specific heat and making the same heat transfer measurement on it that is made on the working fluid.

Yet another aspect of the invention is that it provides a solution to the problem of flow-rate-induced inaccuracies when measuring the specific heat of a working fluid flowing through a heat transfer system.

The invention embraces the use of any of a wide variety of thermal transfer sensors including, without limit, those using resistance temperature detectors (RTDs), thermoelectric modules (TEMs) and combinations thereof. Moreover, there are many structures that may be useful in providing a nearly stagnant portion of a volume of working fluid, where the stagnant portion is in throttled communication with the rest of the fluid. These structures include, without limitation, enclosures having multiple small ports spaced apart transverse to a fluid flow direction, enclosures made of a porous material, and enclosures made by winding an impervious sheet about a thermal sensor in a 'jellyroll' configuration.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms "include" and "comprise," as well as derivatives thereof, mean inclusion without limitation; the term "or," is inclusive, meaning and/or. Moreover, the term 'flow channel' is used to denote a pipe, weir, or any other body through which fluid can flow. The term 'working fluid' stands for any sort of fluid usable in a heat exchanger.

Figure 1:
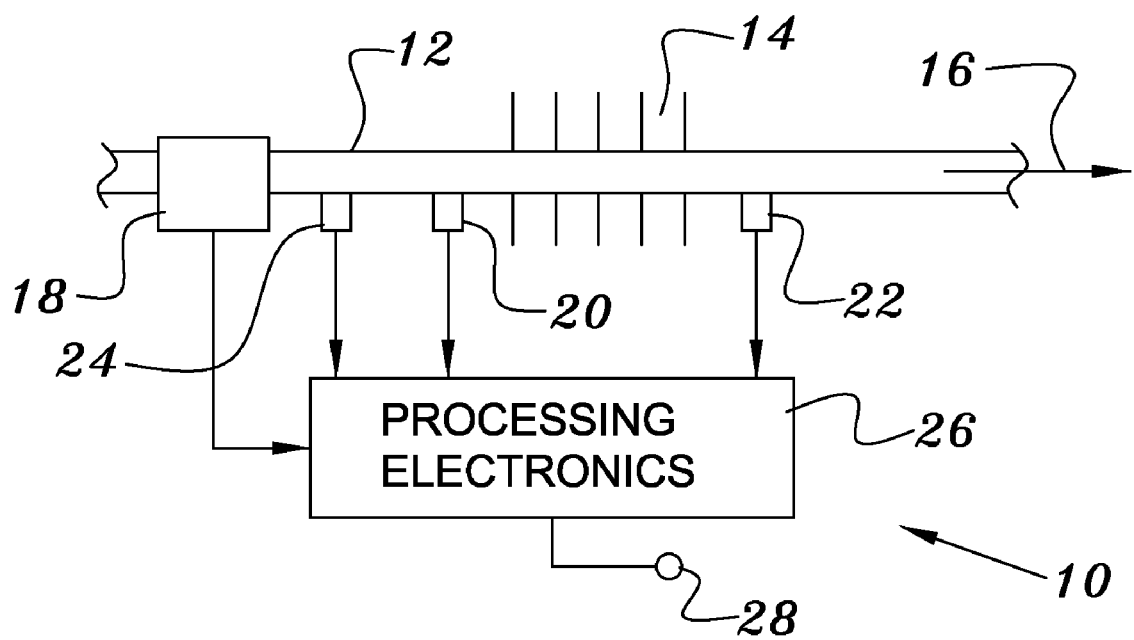
FIG. 1 is a schematic depiction of a heat transfer measurement system in which specific heat of the working fluid is measured.

Turning now to FIG. 1, one finds a block diagram of a heat metering arrangement 10. A flow rate of a working fluid 11, flowing through a pipe 12 and a heat exchanger 14 as indicated by the arrow 16, is measured with a flow sensor 18. Inlet and outlet temperature sensors 20, 22 are used to measure the inlet and outlet temperatures of the heat exchanger, as is conventional in heat meters. The depicted embodiment also provides a separate specific heat sensor comprising a sensing element 24 and processing electronics 26. Although the specific heat sensing element 24 is depicted as being upstream of the inlet temperature sensor 20, the ensuing discussion will make it clear that this element could be situated in many locations, e.g., at the outlet of the heat exchanger 14.

The specific heat value from the specific heat sensing element 24 is then used by the processing electronics 26, along with the flow rate and inlet and outlet temperatures to provide an output signal 28 representative of the heat energy transferred by the heat exchanger. This is described at greater length in the inventor's parent application U.S. Ser. No. 12/499,420, now issued as U.S. Pat. No. 7,775,706.

The specific heat sensor depicted in FIG. 1 comprises a heated temperature sensing element 24 in thermal contact with at least some of the fluid 11. This sensing element is periodically energized to raise its temperature above the ambient temperature of the working fluid. In cases in which the specific heat sensing element is in good thermal contact with the flowing fluid, this measured temperature rise must be corrected for the fluid flow rate by the processing electronics 26 in order to derive a measure of the fluid's specific heat. Avoiding inaccuracies associated with this correction requires making the heat transfer measurement on at least a portion of the fluid that is essentially not flowing. As noted above, prior workers in the field have accomplished this by the generally unacceptable expedient of shutting off flow whenever a specific heat measurement was to be made.

Figure 2:
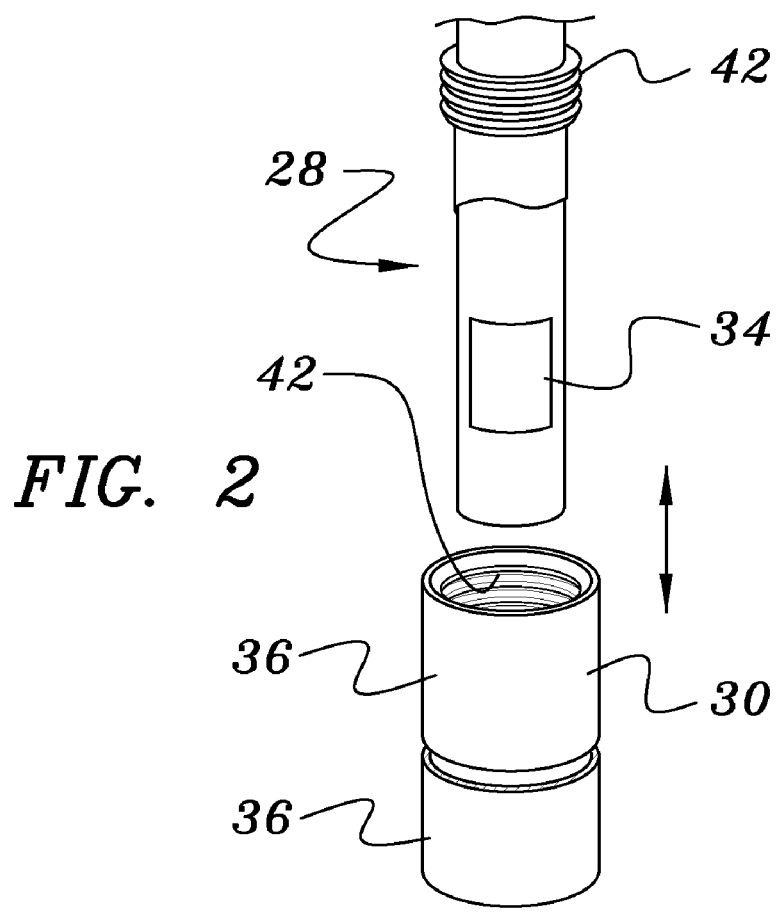
FIG. 2 is an exploded view of a specific heat measuring probe of the invention comprising a thermal transfer sensor and an enclosure that can be fitted about at least a sensing end of the probe.

Turning now to FIG. 2, one finds an exploded view of an embodiment of the invention comprising a thermal transfer probe 28 that fits within a stagnation enclosure 30 so as to define a stagnation volume 32 disposed between a thermal transfer sensor 34 and an inner wall 36 of the stagnation enclosure 30. The stagnation volume 32 is in throttled communication with the bulk of the flowing fluid so that fluid 11 can seep into and out of the stagnation volume at a seepage rate substantially less than the selected flow rate of fluid outside the enclosure.

When the seepage rate is far less than the selected flow rate of the fluid a specific heat measurement made on the fluid present in the stagnation volume is made at essentially zero flow rate so that the measured specific heat does not have to be corrected for flow effects. Clearly, this sort of arrangement admits of two limiting values to the seepage rate, neither of which is acceptable. If the seepage rate is zero, no fluid can enter or leave the stagnation chamber and changes to the specific heat of the working fluid can not be measured. On the other hand, if the enclosure supplies essentially no flow impedance then the seepage rate will be equal to the selected flow rate and any measurement of specific heat will have to include undesirable corrections for flow effects.

In practice, a wide range of seepage rates are useful, as long as the selected seepage rate provides no more than a tolerable flow-related error. For example, seepage rates of less than one percent of the selected flow rate of the working fluid can provide specific heat measurement that are essentially equivalent to zero flow measurements. However, even lower seepage rates (e.g., on the order of one tenth of one percent of the selected working fluid flow rate) have been used to track changes in the specific heat of a fluid.

Figure 3:
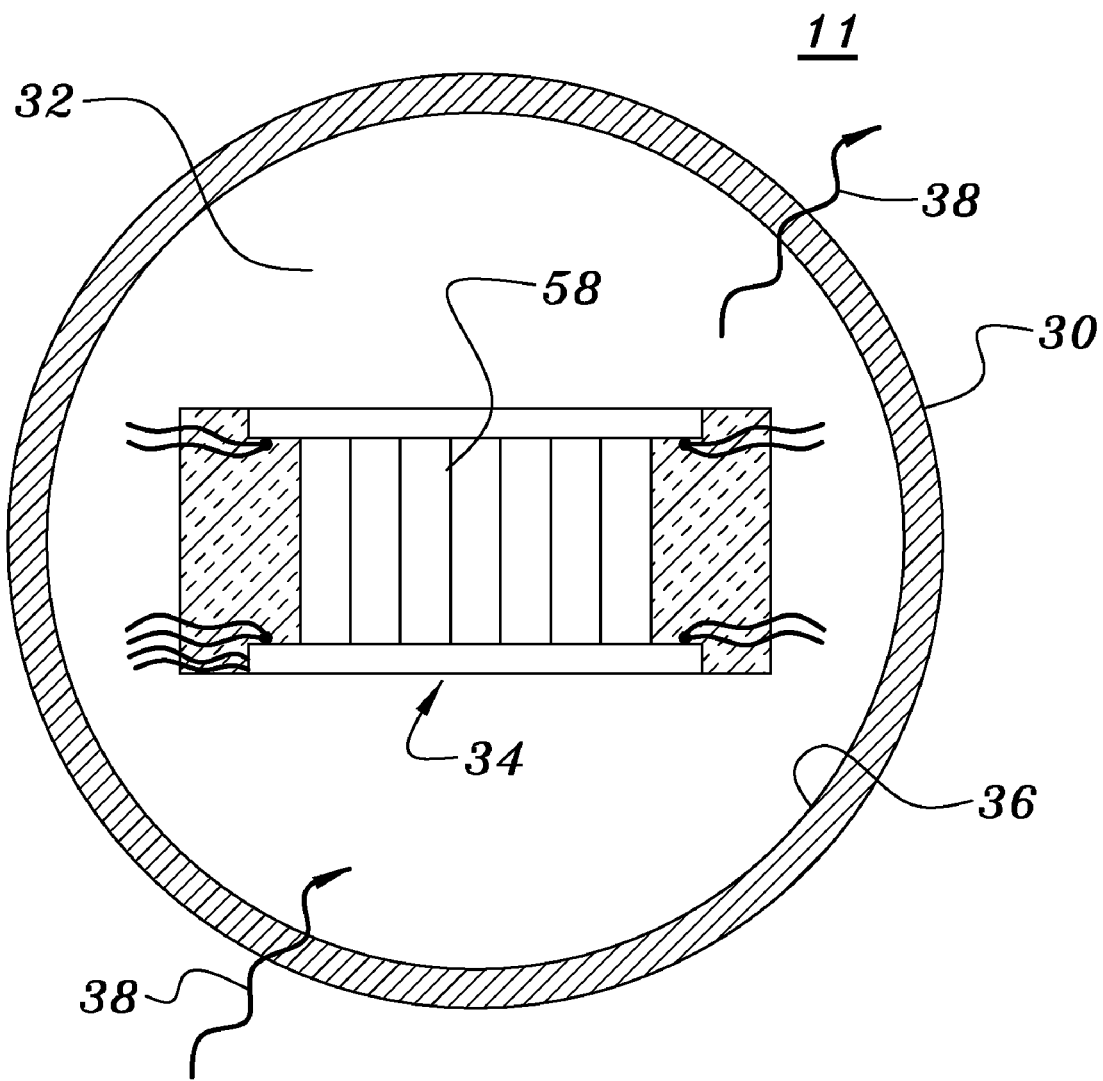
FIG. 3 is a cross-sectional view of a specific heat measurement probe of the invention comprising a thermoelectric thermal transfer sensor and a porous enclosure.
Figure 4:
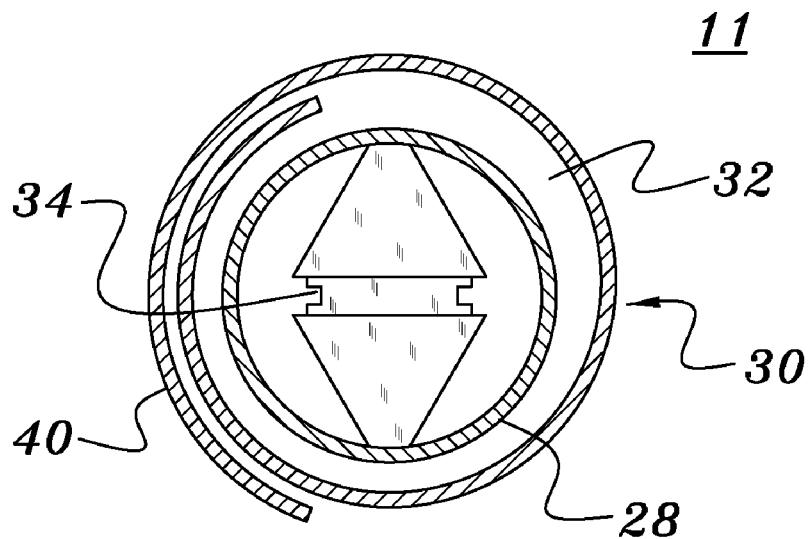
FIG. 4 is a cross-sectional view of another embodiment of a specific heat measurement probe of the invention.

It should be recognized that there are many design approaches that will provide the desired flow impedance between the outside of the stagnation enclosure and the stagnation volume inside that enclosure. In the embodiment depicted in FIG. 2, for example, several small holes 36 are provided in an otherwise impermeable enclosure wall. These holes are preferably spaced apart along a line transverse to the direction of working fluid flow. Although two holes are shown in FIG. 2, the reader will recognize that additional ones may be provided as long as their number and size are not so great as to allow an overly high seepage rate. In another embodiment, depicted in FIG. 3, where the seepage is indicated by wavy arrows 38, a very large number of very small holes is provided by making the enclosure out of a permeable material (e.g., a sintered bronze filter). In yet another variation, as depicted in FIG. 4, an impermeable sheet of material 40 is rolled into a 'jellyroll' spiral and a thermal transfer probe 28 is inserted into it. The reader will recognize that this set of examples is not exhaustive and that many other sorts of stagnation enclosures may be configured without departing from the invention.

A specific heat sensor of the invention may be configured with a stagnation enclosure permanently attached around a thermal transfer sensor. Alternately, the enclosure may be readily removable from the thermal transfer sensor. Although the readily removable enclosure 30 of FIG. 2 is depicted as being connectable to the associated thermal transfer probe 28 by means of threads 42, the reader will recognize that one may use any of many other temporary fastening arrangements that include, but are not limited to tightly fitting O-rings or gaskets, adhesives, bayonet fittings and the like.

Because changes in specific heat are expected to be either slow or occasional, a single thermal transfer sensor probe adapted for use with a stagnation enclosure can be used most of the time for mass flow measurement and occasionally for specific heat measurement. This is most easily accomplished by installing a thermal transfer sensor probe in a fitting that allows for it to be withdrawn and reinserted while a heat exchanger is operating. When the specific heat measurement is to be made, the thermal sensor probe is withdrawn from the heat exchanger, fitted with the stagnation enclosure, reinserted into the heat exchange system, allowed to soak for a long enough interval to allow seepage to fill its associated stagnation chamber, and then operated to measure the specific heat of the working fluid. Subsequently, the probe is withdrawn again, stripped of the stagnation enclosure and re-inserted so that it can be used to measure flow.

Figure 5:
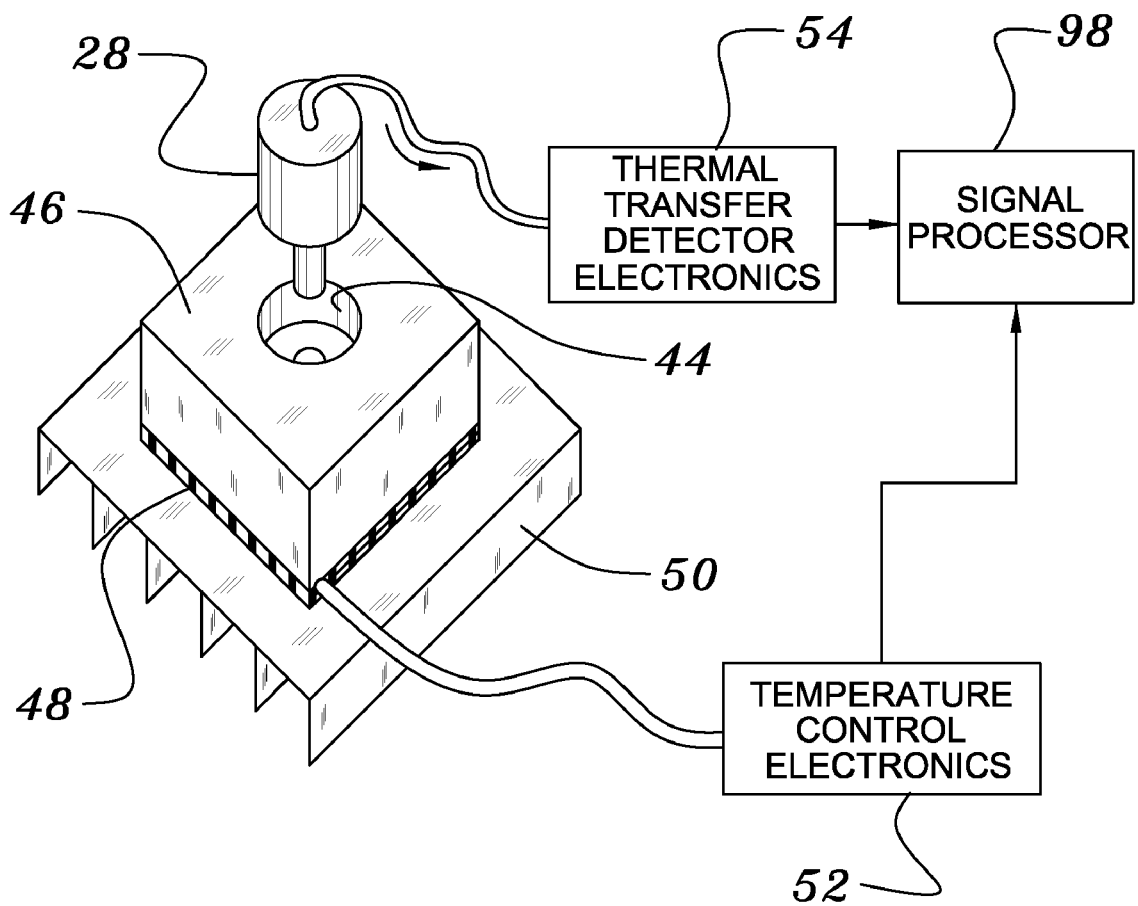
FIG. 5 is a perspective view of a specific heat measurement instrument for determining specific heat of a sample of working fluid removed from a heat exchanger system.

Another approach to measuring the specific heat of a working fluid is to withdraw a small sample of the fluid and make the measurement in a separate chamber 44. This allows for measurement under true no-flow conditions and, more significantly, allows one to measure the specific heat of the working fluid at a variety of selected temperatures without having to change the operating temperature of the heat exchange system. Turning now to FIG. 5, one finds a chamber 44 formed in a block 46 of a good thermal conductor, such as aluminum. In a preferred embodiment, a heating element 48, which is preferably a thermoelectric device, is in thermal contact with both the block and a heat sink 50 and is controllable, by means of appropriate temperature control electronics 52, to control the temperature of fluid in the chamber 44 to a selected value. After the working fluid sample is placed in the chamber, a thermal transfer probe 28 is inserted into the chamber and operated, by means of appropriate sensor electronics 54, to generate a signal representative of the specific heat of the fluid at the selected temperature. The accuracy of this procedure may be checked, and an appropriate correction supplied, by making the same measurement on a reference fluid having a known specific heat at whatever measurement temperature is employed.

The thermal transfer sensors used for measuring specific heat may be of several types and include, without limitation, a resistance temperature detector (RTD) 56 and a thermoelectric module (TEM) 58.

Figure 6:
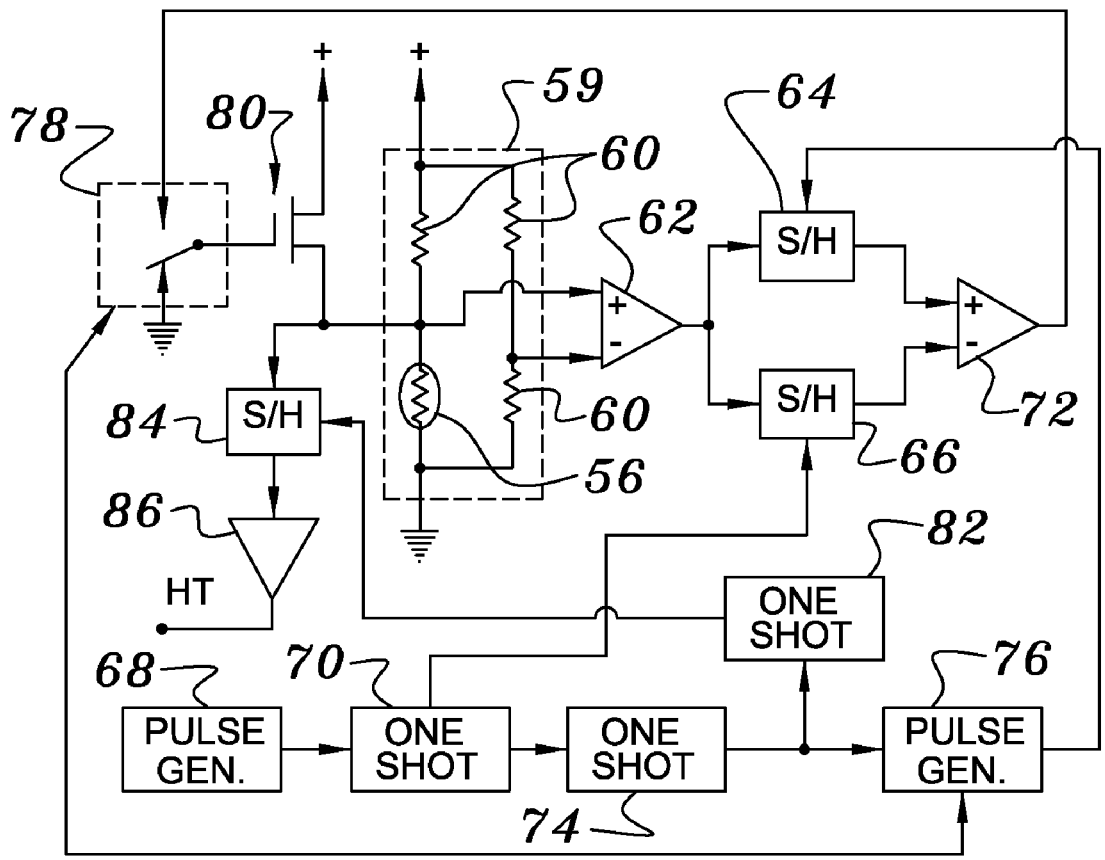
FIG. 6 is a schematic depiction of an electrical circuit usable with embodiments of the invention comprising a thermal transfer sensor using a metallic resistance temperature detector.

An example of an electrical circuit usable with the RTD 56 is depicted in FIG. 6. Here, a bridge circuit 59, consisting of the RTD 56 and several fixed resistors 60, provides an output signal to a differential amplifier 62. The differential amplifier 62 provides an output to a pair of sample and hold circuits 64,66. A pulse generator 68 periodically (e.g., once a minute) provides a pulse to trigger a one-shot 70 which enables a sample and hold 66 so that the negative input of a second differential amplifier 72 is maintained at a voltage level corresponding to the fluid temperature.

After the fluid temperature measurement has been completed, another one shot 74 is triggered to produce a pulse which enables a pulse generator 76 to produce short duration (e.g., 100 microseconds) sampling pulses at a relatively high repetition rate (e.g., 1 KHz) to a sample and hold circuit 64. Corresponding inverted pulses are supplied to a relay 78. This ensures that power is directly applied to the RTD 56 most of time, while its temperature is sensed for only short periods. The RTD 56 is connected to the control transistor 80 in a negative feedback loop where the voltage across it is initially relatively high but diminishes to a stable value when the RTD 56 has been heated sufficiently to cause its temperature to raise the designated amount above the fluid temperature.

The second one-shot 74 also triggers a third one-shot 82 which enables another sample and hold 84 to detect the voltage across the RTD 56. When amplified by an output amplifier 86, this becomes the output signal. The output signal is used with the resistance value of the RTD to determine the power that the RTD requires to raise its temperature the designated amount above that of the fluid temperature and thereby establishes a heat transfer factor for the fluid.

Figure 7:
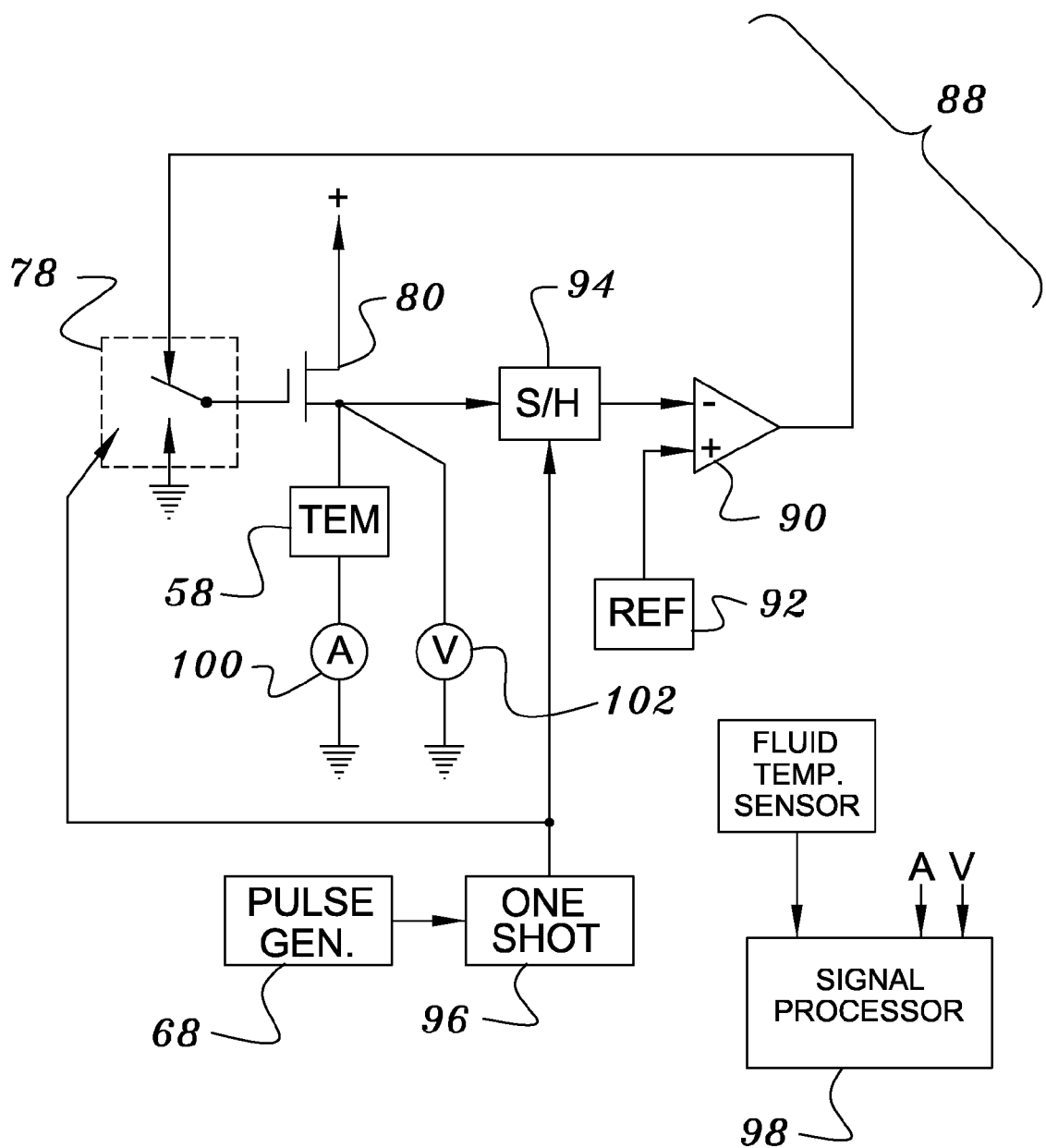
FIG. 7 is a schematic depiction of an electrical circuit usable with embodiments of the invention comprising a thermal transfer sensor using a thermoelectric module.

An electrical circuit 88 usable with the TEM 58 configuration appears in FIG. 7 in a partially schematic and partially block diagram depiction. A relay 78, normally deenergized, connects the gate of a control FET 80 to a differential amplifier 90 which has its inputs from a reference voltage source 92 and a sample and hold 94. The sample and hold 94 detects the signal generated by the TEM 58 during relatively short pulses provided by a one shot 96 that is triggered by a pulse generator 98. The pulses are then amplified and inverted by the differential amplifier 90 to control the FET 80 in a negative feedback loop. During the time when the sample and hold 94 detects the TEM signal the relay 78 changes state so that the TEM is unpowered and its terminal voltage reflects the temperature differential across its plates. The reference 92 provides the amplifier 90 with an offset which sets the temperature difference between the TEMs plates. It may be noted that the FET 80 in FIG. 7 could be replaced by a switch-mode regulator having a low pass output filter. This would reduce the power dissipation of the circuit and increase its efficiency.

In an example of the operation of the circuit 88, a momentary lower than set temperature difference across the TEM 58 will provide a lower voltage to the amplifier 90, which will then provide a higher voltage to the FET 80 to increase the current through the TEM so as to drive the temperature difference toward the set value. The TEM current (schematically depicted as being measured with an ammeter 100 that provides an input to the signal processor 98) and voltage (depicted as being measured by a voltmeter 102, which also provides a respective input to the signal processor 98) are the principal factors from which the processor 98 can determine the heat transfer from the TEM to the fluid and thereby derive the fluid's heat transfer factor. The processor can also take into account the TEM's temperature and current and make minor adjustments to compensate for variation in the TEM's characteristics.

If the normally closed contact of the relay 78 is connected instead to a voltage source to set the nominal power supplied to the TEM 58, the output from the amplifier 90 is the amplified output from the TEM which may then used by a signal processor 98 as an indication of TEM heat transfer to the fluid.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A method of measuring a specific heat value and a fluid flow rate of a working fluid flowing along a channel at the fluid flow rate, the method comprising the steps of:
   providing a probe comprising:
      a thermal transfer sensor operable to exchange heat with the working fluid and to provide a signal representative of the quantity of heat exchanged; and
      an enclosure at least partially surrounding the thermal transfer sensor, the enclosure defining a stagnation chamber in throttled communication with an outside of the enclosure whereby the working fluid can flow into and out of the stagnation chamber at a seepage rate substantially less than the fluid flow rate;
   measuring the specific heat value by carrying out the sequentially executed substeps of:
   inserting the probe into the working fluid;
   waiting for a portion of the working fluid to seep into the stagnation chamber;
   powering the thermal transfer sensor to change a temperature of a portion thereof by a selected amount so as to exchange heat with the fluid in the stagnation chamber and to provide the signal representative of the amount of heat exchanged; and
   calculating the value of the specific heat of the working fluid from the signal representative of the amount of heat exchanged; and
   measuring the fluid flow rate by carrying out the sequentially executed substeps of:
   removing the enclosure from the probe; and
   inserting the probe into the working fluid and operating the thermal transfer sensor to measure the fluid flow rate.

2. The method of claim 1 wherein the enclosure comprises a porous wall through which the fluid can flow at the seepage rate.

3. The method of claim 1 wherein the enclosure comprises at least two ports spaced apart transverse to the channel.

4. The method of claim 1 wherein the seepage rate is no more than one percent of the fluid flow rate.

5. The method of claim 1 wherein the seepage rate is no more than one tenth of one percent of the fluid flow rate.

6. A method of measuring a specific heat value of a working fluid flowing along a channel at a fluid flow rate, the method comprising the steps of:
   providing a probe comprising:
      a thermal transfer sensor operable to exchange heat with the working fluid, and to provide a signal representative of the quantity of heat exchanged; and
      an enclosure at least partially surrounding the thermal transfer sensor, the enclosure defining a stagnation chamber in throttled communication with an outside of the enclosure whereby the working fluid can flow into and out of the stagnation chamber at a seepage rate substantially less than the fluid flow rate, the enclosure comprising a sheet of material wrapped in a spiral fashion about an axis of the probe;
   inserting the probe into the working fluid;
   waiting for a portion of the working fluid to seep into the stagnation chamber;
   powering the thermal transfer sensor to change a temperature of a portion thereof by a selected amount so as to exchange heat with the fluid in the stagnation chamber and to provide the signal representative of the amount of heat exchanged; and
   calculating the value of the specific heat of the working fluid from the signal.

7. A method of determining a calibrated specific heat value of a heat exchanger fluid by comparing a measured specific heat value of the heat exchanger fluid with a measured specific heat value of a reference fluid having a known specific heat, wherein:
   measurement of the specific heat value of the heat exchanger fluid comprises the sequentially executed steps of:
   transferring a sample of the heat exchanger fluid from a heat exchanger to a measurement chamber in which no flow occurs;
   inserting a thermal transfer probe into the fluid sample;
   powering a thermal transfer sensor to change a temperature of a portion thereof by a selected amount, to thereafter exchange heat with the fluid in the measurement chamber and to provide to a signal processing circuit a first signal representative of the measured value of the specific heat of the heat exchanger fluid; and wherein
   measurement of the specific heat value of the reference fluid comprises the sequentially executed steps of:
   transferring a sample of the reference fluid into the measurement chamber;
   inserting the thermal transfer probe into the reference fluid sample;
   powering the thermal sensor to change a temperature of a portion thereof by the selected amount and to thereafter exchange heat with the reference fluid, the thermal sensor further providing to the signal processing circuit a second signal representative of the value of the specific heat of the reference fluid; and
   comparing, by means of the signal processing circuit, the first and second signals to determine the calibrated value of the specific heat of the heat exchanger fluid.

8. The method of claim 7 further comprising a step of using a thermoelectric module to control the temperature of the measurement chamber to be a selected temperature.

* * * * *